US010038543B2

(12) United States Patent
Wang et al.

(10) Patent No.: US 10,038,543 B2
(45) Date of Patent: Jul. 31, 2018

(54) MANY TO ONE COMMUNICATIONS PROTOCOL

(71) Applicant: MEDIATEK Singapore Pte. Ltd., Singapore (SG)

(72) Inventors: Chao-Chun Wang, Taipei (TW); Jianhan Liu, San Jose, CA (US); Tianyu Wu, San Jose, CA (US); Rongsheng Huang, Fremont, CA (US)

(73) Assignee: MEDIATEK Singapore Pte. Ltd., Singapore (SG)

( * ) Notice: Subject to any disclaimer, the term of this patent is extended or adjusted under 35 U.S.C. 154(b) by 0 days.

(21) Appl. No.: 14/788,752

(22) Filed: Jun. 30, 2015

(65) Prior Publication Data
US 2016/0006554 A1 Jan. 7, 2016

Related U.S. Application Data

(60) Provisional application No. 62/019,479, filed on Jul. 1, 2014.

(51) Int. Cl.
H04L 5/00 (2006.01)
H04B 7/0452 (2017.01)
H04W 74/08 (2009.01)

(52) U.S. Cl.
CPC ......... *H04L 5/0073* (2013.01); *H04B 7/0452* (2013.01); *H04W 74/0816* (2013.01); *H04L 5/0023* (2013.01)

(58) Field of Classification Search
CPC ......... H04B 7/024; H04B 7/0452; H04L 1/00; H04L 1/1685; H04L 1/1854;
(Continued)

(56) References Cited

U.S. PATENT DOCUMENTS

| 8,619,640 B2 | 12/2013 | Park ........................... 370/278 |
| 2005/0015703 A1 | 1/2005 | Terry et al. .................. 714/776 |

(Continued)

FOREIGN PATENT DOCUMENTS

| EP | 2739106 A2 | 12/2012 |
| WO | WO2013182250 A1 | 6/2012 |

(Continued)

OTHER PUBLICATIONS

International Search Report and Written Opinion of International Search Authority for PCT/SG2015/050194 dated Sep. 30, 2015 (9 pages).

(Continued)

*Primary Examiner* — Marsha D Banks Harold
*Assistant Examiner* — Dharmesh Patel
(74) *Attorney, Agent, or Firm* — Imperium Patent Works; Helen Mao

(57) ABSTRACT

Methods and apparatus are provided for a many to one communication protocol. In one novel aspect, a modified CTS is sent by a receiving wireless communications station in response to a regular RTS. The modified CTS includes an indication for an uplink MU operation. In one embodiment, a modified CTS indicates a restricted access window (RAW) followed by RAW parameter set (RPS). In one embodiment, a subset of wireless communications devices associated with the receiving wireless communications station sends modified PS-poll with uplink data indication. Such PS-poll traffic is protected from passerby wireless communications devices from an OBSS. The receiving wireless communications station sends a modified resource-allocation map frame followed by a regular CTS frame. The subsets of wireless communications devices send their uplink data based on the received resource allocation map. The RTS-originating (Continued)

wireless station either sends its data frame earlier or concurrently with other wireless communications devices.

24 Claims, 6 Drawing Sheets

(58) Field of Classification Search
CPC ... H04L 1/1867; H04L 1/1896; H04L 5/0007; H04L 5/0023; H04L 5/0053; H04L 5/0073; H04W 24/00; H04W 28/065; H04W 48/00; H04W 72/042; H04W 72/085; H04W 72/082; H04W 72/087; H04W 72/0446; H04W 74/00; H04W 74/0816

See application file for complete search history.

(56) References Cited

U.S. PATENT DOCUMENTS

| | | | |
|---|---|---|---|
| 2006/0050742 A1* | 3/2006 | Grandhi | H04W 74/0816 370/506 |
| 2006/0281404 A1* | 12/2006 | Lee | H04B 7/2606 455/11.1 |
| 2009/0086706 A1 | 4/2009 | Huang et al. | 370/349 |
| 2012/0106426 A1* | 5/2012 | Hart | H04L 5/0092 370/312 |
| 2012/0189072 A1* | 7/2012 | Tzannes | H04L 27/2613 375/260 |
| 2012/0207036 A1* | 8/2012 | Ong | H04W 74/0816 370/252 |
| 2013/0198383 A1* | 8/2013 | Tseng | H04L 63/102 709/225 |
| 2013/0294420 A1* | 11/2013 | Ko | H04W 74/06 370/336 |
| 2014/0153415 A1 | 6/2014 | Choudhury et al. | 370/252 |
| 2014/0328195 A1* | 11/2014 | Sampath | H04W 72/082 370/252 |
| 2015/0201401 A1 | 7/2015 | Lahetkangas et al. | 370/329 |
| 2015/0289242 A1 | 10/2015 | Cheong et al. | |
| 2016/0066198 A1* | 3/2016 | Wang | H04W 16/28 370/338 |

FOREIGN PATENT DOCUMENTS

| | | | | |
|---|---|---|---|---|
| WO | WO2014065611 A1 | 10/2012 | | |
| WO | WO2014092450 A1 | 12/2012 | | |
| WO | WO 2013/182250 A1 * | 12/2013 | | H04L 1/0079 |

OTHER PUBLICATIONS

EPO, search report for the EP patent application 15815884.0 dated Dec. 21, 2017 (7 pages).

* cited by examiner

MANY TO ONE COMMUNICATIONS PROTOCOL

CROSS REFERENCE TO RELATED APPLICATIONS

This application claims priority under 35 U.S.C. § 119 from U.S. Provisional Application No. 62/019,479, entitled, "UPLINK MULTI-USER (MU) MIMO/OFDMA MAC PROTOCOL" filed on Jul. 1, 2014; the subject matter of which is incorporated herein by reference.

TECHNICAL FIELD

The disclosed embodiments relate generally to wireless communication, and, more particularly, to many to one communications protocol.

BACKGROUND

The amount of data transmitted over the internet has been growing exponentially. With the rapid development of the technology, wireless connections will not only connect people via voice and data communications but also will connect smart devices, also called Internet of Things (IoT). The number of devices connected through wireless communication demands higher efficiency of the wireless network. Many wireless technologies are not currently adapted to support the emerging market of IoT. For example, the WiFi network, widely used today, is not suitable for such development because the current WiFi is designed to offer higher throughput to a limited number of wireless communications devices concurrently. The current WiFi network uses single user (SU) mode when accessing the network. In a high-density environment, the single-user mode causes many collisions, reduces the total network throughput, and possibly leads to congestive collapse.

In the tradition WiFi network, SU uplink transmission is used. During SU uplink, the WiFi radio holds back and only transmits for one user at a time. The inefficiency of single-user uplink requires many retransmissions due to collisions. Further, in a high-density network, especially with many IoT devices, the majority of data packets are control and management frames.

Multiple user (MU) uplink method reduces collision and therefore, increases overall system efficiency. The problem remains how to implement multi-user uplink access. For example, overlapping base station (OBSS) exists in typical deployments. Inter BSS interferences exist caused by OBSS.

Improvement and enhancement are required for uplink MU OFDMA/MIMO protocol.

SUMMARY

Methods and apparatus are provided for uplink multi-user protocol in an Orthogonal Frequency De-Modulation Multiple Access (OFDMA)/multiple-input multiple-output MIMO wireless network.

In one novel aspect, a modified CTS is sent by a base station in response to a regular RTS. The modified CTS includes an indication for an uplink MU operation. In one embodiment, the base station determines to use the MU operation if the RTS-originating wireless communications device belongs to a MU group and/or certain network conditions are met. In one embodiment, a modified CTS indicates a restricted access window (RAW) followed by RAW parameter set (RPS). In one embodiment, a subset of wireless communications devices associated with the base station sends modified PS-poll with uplink data indication. Such PS-poll traffic is protected from passerby wireless communications devices from an overlapping base station (OBSS). In one embodiment, the PS-poll can be a NDP PS-poll frame.

In one embodiment, the RTS-originating wireless communications device sends uplink data first such that the base station has time to determine the resource allocation map for the multiple users. The base station sends a modified resource-allocation map frame to the group of wireless communications devices followed by a regular CTS frame. The group of wireless communications devices send the uplink data based on the received resource allocation map. In another embodiment, the RTS-originating wireless communications device sends its data frames concurrently with the group of the other wireless communications devices.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
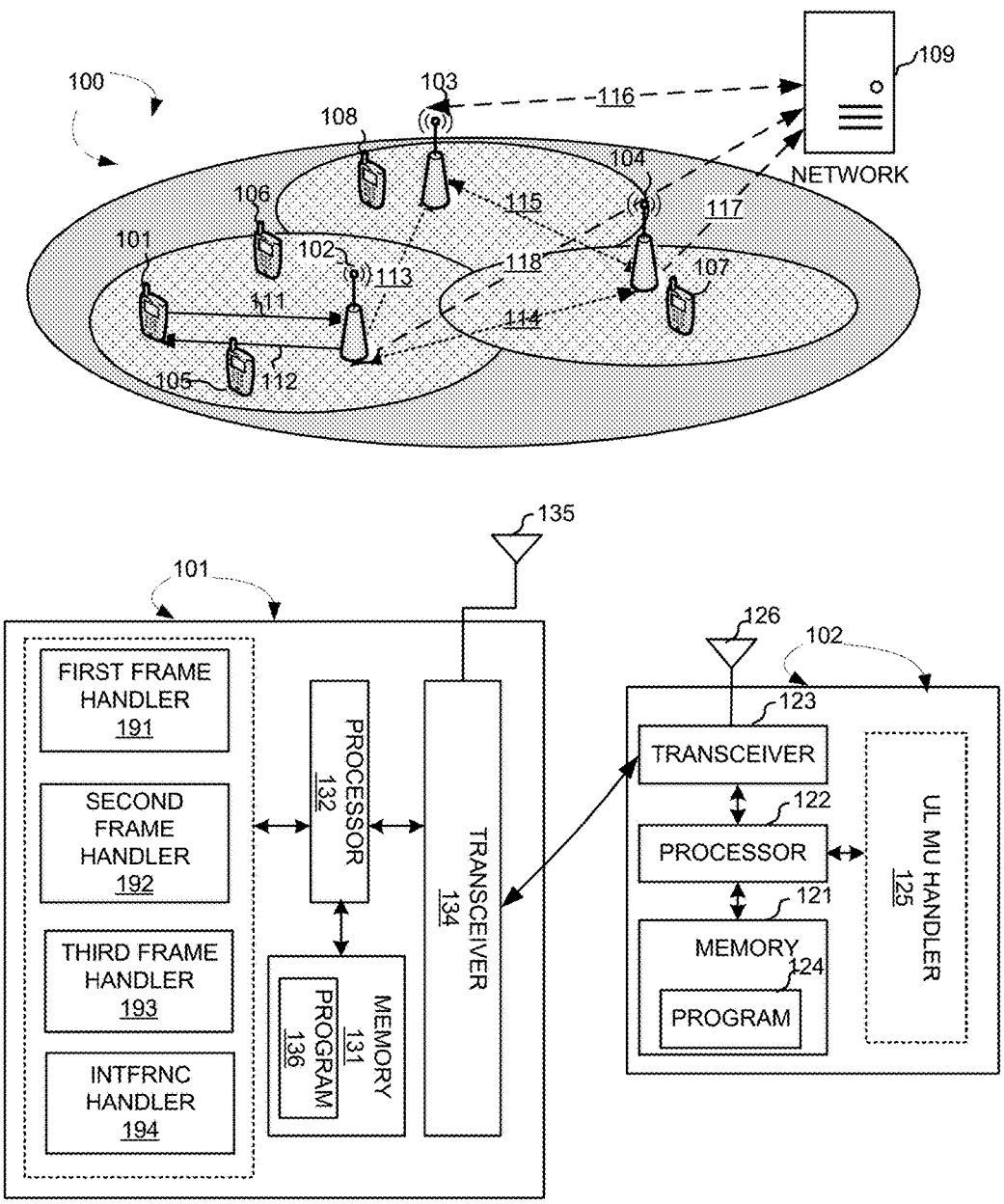
FIG. 1 illustrates an exemplary wireless communication network with wireless communications devices requiring radio resource in accordance with embodiments of the current invention.

FIG. 1 illustrates an exemplary wireless network 100 using uplink multi-user OFDMA/MIMO in accordance with embodiments of the current invention. Wireless communication system 100 includes one or more wireless networks each of the wireless communication network has a fixed base infrastructure units, such as receiving wireless communications devices 102 103, and 104, forming wireless networks distributed over a geographical region. The base unit may also be referred to as an access point, an access terminal, a base station, a Node-B, an eNode-B, or by other terminology used in the art. Each of the receiving wireless communications devices 102, 103, and 104 serves a geographic area. Backhaul connections 113, 114 and 115 connect the non-co-located receiving wireless communications devices, such as 102, 103, and 104. These backhaul connections can be either ideal or non-ideal A wireless communications device 101 in wireless network 100 is served by base station 102 via uplink 111 and downlink 112. Other wireless communications devices 105, 106, 107, and 108 are served by different base stations. Wireless communications devices 105 and 106 are served by base station 102. Wireless communications device 107 is served by base station 104. Wireless communications device 108 is served by base station 103.

In one embodiment, wireless communication network 100 is an OFDMA/MIMO system comprising base stations/access points (APs) 102, 103 and 104, and a plurality of mobile stations, such as wireless station 101, 105, 106, 107 and 108. In the applications, each base station serves multiple wireless communications devices that periodically transmit packets. In some scenarios, huge number of wireless stations contenting for the wireless channel results in collisions, long transmission range leads to high interface spaces and short packets increase overhead caused by headers. In one novel aspect, downlink transmissions to multiple wireless stations using OFDMA are aggregated. When there is a downlink packet to be sent from a base station to a mobile station, data frames from different mobile stations meeting certain criteria are aggregated using OFDMA and transmitted together. In another novel aspect, multi-user OFDMA/MIMO is used for uplink transmission. A network entity, such as a wireless controller 109 is connected with base stations such as base station 102, 103, and 104, via links of 116, 117, and 118.

FIG. 1 further shows simplified block diagrams of wireless stations 101 and base station 102 in accordance with the current invention.

Base station 102 has an antenna 126, which transmits and receives radio signals. A RF transceiver module 123, coupled with the antenna, receives RF signals from antenna 126, converts them to baseband signals and sends them to processor 122. RF transceiver 123 also converts received baseband signals from processor 122, converts them to RF signals, and sends out to antenna 126. Processor 122 processes the received baseband signals and invokes different functional modules to perform features in base station 102. Memory 121 stores program instructions and data 124 to control the operations of base station 102. Base station 102 also includes a set of control modules, such as UL MU handler 125 that carry out functional tasks to communicate with wireless communications devices.

Wireless communications device 101 has an antenna 135, which transmits and receives radio signals. A RF transceiver module 134, coupled with the antenna, receives RF signals from antenna 135, converts them to baseband signals and sends them to processor 132. RF transceiver 134 also converts received baseband signals from processor 132, converts them to RF signals, and sends out to antenna 135. Processor 132 processes the received baseband signals and invokes different functional modules to perform features in mobile station 101. Memory 131 stores program instructions and data 136 to control the operations of mobile station 101.

Wireless communications device 101 also includes a set of control modules that carry out functional tasks. A first frame handler 191 transmits a first frame to a first base station. A second frame handler 192 receives a second frame from the first base station using a wideband channel comprising a plurality of narrow bands, wherein the second frame set up a protection period for succeeding frame exchanges to avoid interference from one or more passerby wireless communications devices belonging to one or more overlapping base stations. A third frame handler 193 transmits a third frame to the first base station concurrently with data frames from a subset of wireless communications devices associating with the first base station, wherein a corresponding subset of narrow bands of the wideband channel is used by each corresponding wireless communications device of the subset for data or a radio resource request. An interference handler 194 receives further transmission opportunities if available such that the further transmission is protected from interferences from the one or more passerby wireless communications devices.

Figure 2:
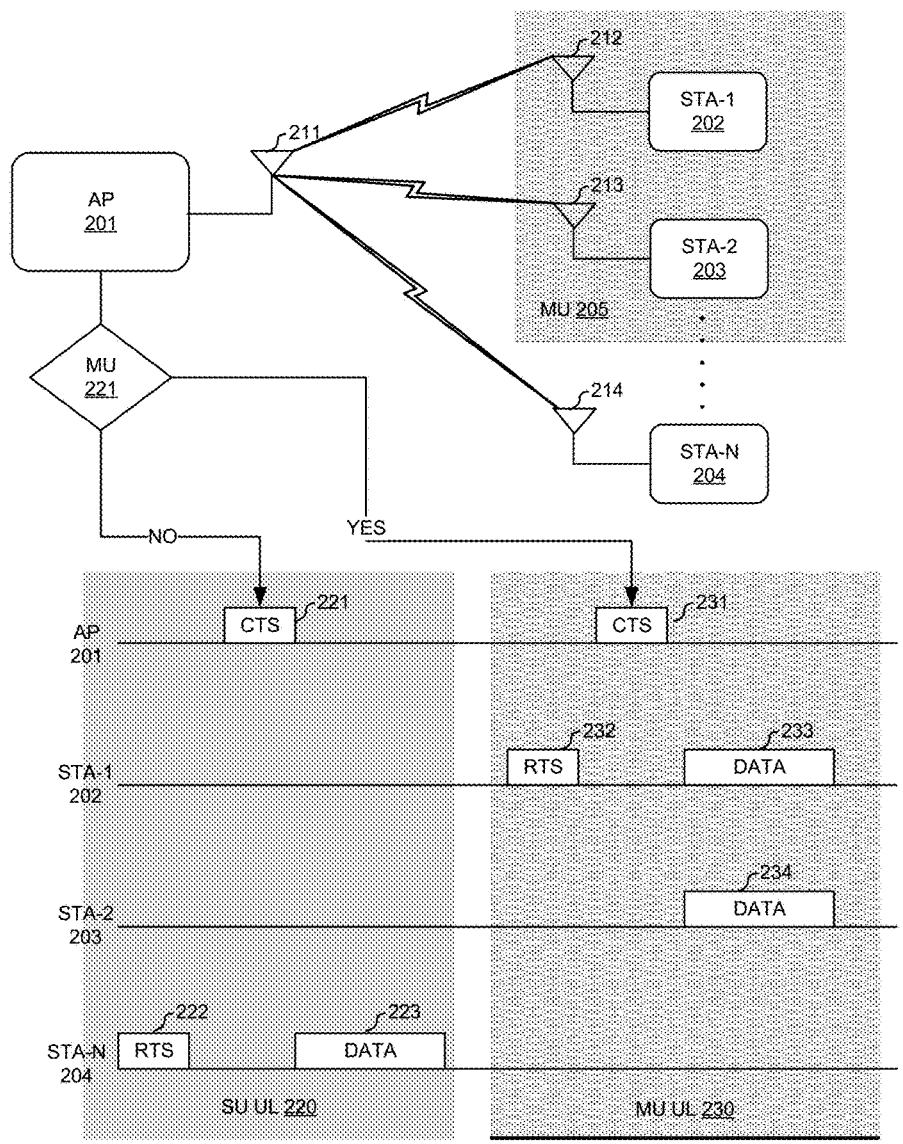
FIG. 2 illustrates an exemplary diagram in a wireless system using multi-user OFDMA/MIMO uplink transmission in accordance with embodiments of the current invention.

FIG. 2 illustrates an exemplary diagram in a wireless system using multi-user OFDMA/MIMO uplink transmission in accordance with embodiments of the current invention. An AP 201, with antenna 211 is configured to support single user and multi-user mode. Exemplary multiple mobile stations STA-1 202, STA-2 203 and STA-N 204 connects to AP 201 via antennas 212, 213 and 214, respectively.

In one novel aspect, AP 201 decides whether to initiate SU or MU operation for uplink request. In one embodiment, mobile stations send request to send (RTS) to the base station upon detecting uplink data to be sent. In one embodiment, the RTS frames sent by the mobile stations are unmodified RTS frames without indication of MU or SU operation. Upon receiving the unmodified RTS, the base station decides whether to initiate the SU operation or the MU operation. If the base station decides to initiate the SU operation, there is no change to the existing UL procedure. If the base station determines to initiate the MU operation, the base station initiates the modified uplink procedure. In one embodiment, the base station determines to initiate the SU operation if the wireless station that sends the RTS does not belong to any MU group. In another embodiment, the base station determines to initiate the SU operation if the base station determines that the SU procedure is the most efficient operation. In another novel aspect, the wireless station may determine whether to initiate the MU operation or using the traditional SU operation. In one embodiment, the wireless communications devices use modified RTS to indicate initiating the MU operation. In yet another novel aspect, a hybrid mode is used when both the base station and the wireless station can initiate the MU operation.

FIG. 2 further illustrates the base station initiates MU operation in accordance to embodiments of the current invention. Multiple STAs STA-1 202, STA-2 203, and STA-N 204 are connected with AP 201. A MU group 205 includes STA-1 202 and STA-2 203. STA-N 204 does not belongs to any MU group. At step 222, STA-N 204 sends a regular RTS to AP 201 for uplink data. Upon receiving the RTS, AP 201 first determines whether to trigger MU operation. At step 221, AP 201 determines whether to use MU operation or SU operation. AP 201 determines to use SU operation for STA-N 204 because STA-N does not belong to any MU group. At step 221, AP 201 replies with an unmodified clear to transmit (CTS). At step 223, STA-N 204 upon receiving the unmodified CTS, sends the uplink data frames.

In other embodiments, the base station can initiate MU operation when receiving unmodified RTS. At step 232, STA-1 202 sends an unmodified RTS to base station 201. Base station, upon receiving the RTS from STA-1 202, checks whether to trigger MU operation at step 221. At step 221, base station 201 determines that MU operation should be used. At step 231, base station 201 sends modified CTS to initiate the MU operation. In one embodiment, the modified CTS has a restricted access window (RAW) indicator followed by a modified RAW parameter set (RPS) frame. In one embodiment, the modified CTS is the regular CTS with "more fragment frame" set to be "1". The modified RPS frame carries RAW information for the MU group wireless communications devices to send power saving (PS)-poll with uplink data information. At step 233, STA-1 202 sends uplink data. At step 234, STA-2 203 also sends uplink data using OFDMA or MIMO. In another embodiment, base station 201 can also determine to trigger SU operation upon receiving RTS from STA-1 202 at step 232 even if STA-1 202 belongs to MU group 205. The determination of whether to trigger MU operation can be done the base station based on triggering event and detected network conditions. In other embodiment, wireless communications devices can also send indicators to the base station to indicate whether to trigger the MU operation.

Figure 3:
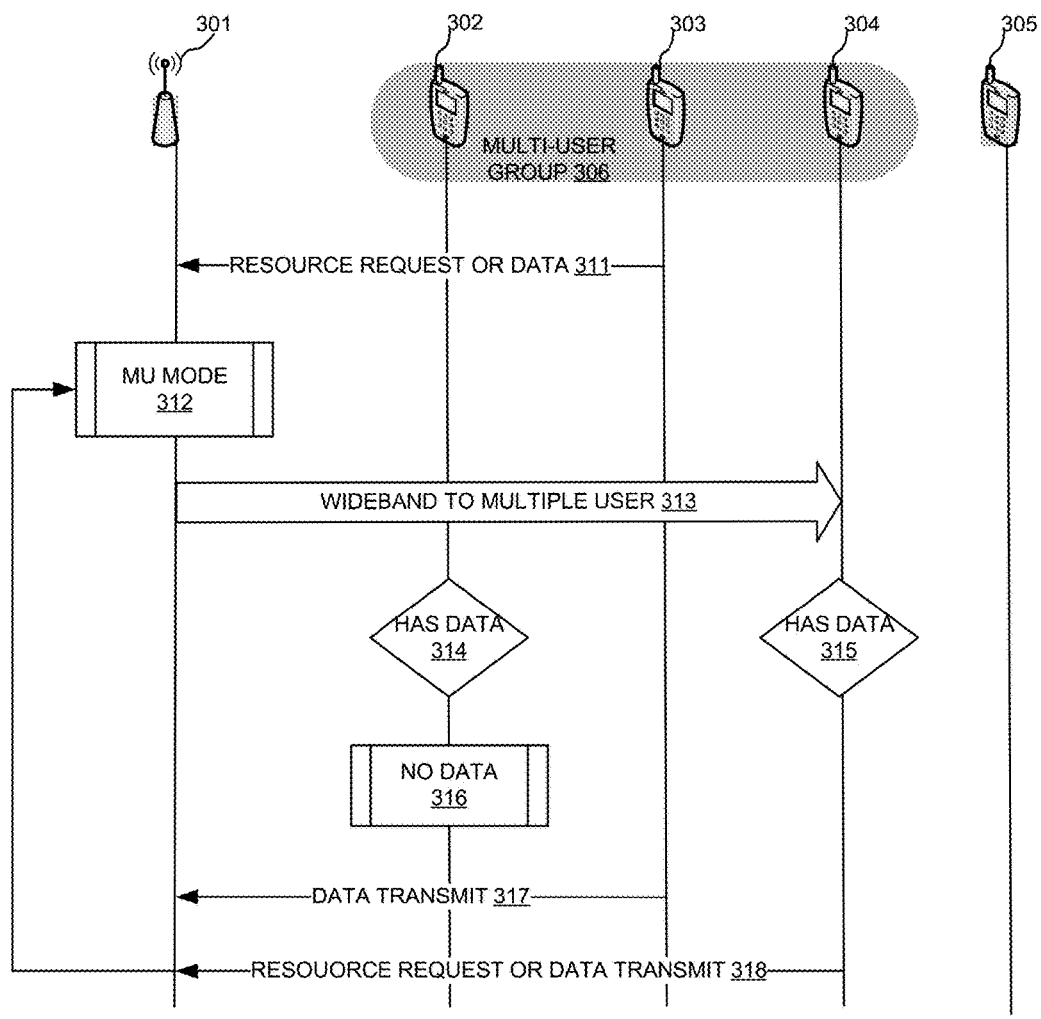
FIG. 3 illustrates an exemplary flow diagram of using MU OFDMA/MIMO for uplink transmission upon receiving data frames or resource request from one wireless communications device in accordance with embodiments of the current invention.

FIG. 3 illustrates an exemplary flow diagram of using MU OFDMA/MIMO for uplink transmission upon receiving data frames or resource request from one wireless communications device in accordance with embodiments of the current invention. A wireless base station/access point (AP) 301 connects with multiple wireless communications devices, such as wireless communications device 302, 303, 304, and 305. Wireless communications devices 302, 303 and 304 belong to the same multi-user group 306. In one novel aspect, MU mode is used to aggregate multiple uplink transmissions when the base station receives a first frame of request from a wireless communications device associated with the base station. The request can be a control message for resource request. The request can also be a data frame from the wireless communications device. If the base station, upon receiving the request, determines MU mode should be triggered, the base station sends a second frame, which is a wideband frame, to a determined subset of wireless communications devices associated with the base station. The wideband transmission is designed to protect the allocated resources from interferences of overlapping base stations (OBSS) for the OFDMA transmission. Upon receiving the second frame from the base station, each wireless communications device in the subset of the wireless communications device determines if it has data to send. If a wireless communications device has data to transmit, it will transmit a third frame concurrently with one or more other wireless communications devices to the base station. The third frame is aggregated with other frames from the wireless communications devices in the subset. The process is repeated by the base station such that each OFDMA transmission is protected from interferences from OBSS.

As shown in FIG. 3, at step 311, wireless communications device 303 sends a resource request or one or more data frames to base station 301. The resource request can be an unmodified RTS. The one or more data frames can be any data transmission from wireless communications device. Upon receiving the first transmission from wireless communications device 303, base station 301 determines whether the MU mode should be used. In one embodiment, base station 301, determines whether to trigger MU mode based on information of the sending wireless communications device, the network condition, and other related information. If base station 301 determines that MU mode should be used, at step 312, base station 301 starts MU mode operation. At step 313, base station 301 sends wideband frames to a subset of wireless stations in associated with base station 301. The transmission is protected from interference from passerby wireless communications devices in the overlapping base stations (OBSS). In one embodiment, the wideband frames can be allocated for PS-Poll for each candidate wireless communications device in the subset. The subset can be all the wireless communications devices in the MU group 306. At step 314, wireless communications device 302 determines if it has data to send. Similarly, at step 315, wireless communications device 304 determines if there is data to be sent. At step 316, wireless communications device 302 determines that there is no uplink data to be sent. There is no more action for wireless communications device 302. At step 315, wireless communications device 304 determines that there is data to be sent. Wireless communications device 304 moves to step 318 and send either a resource request or data frames concurrently with wireless communications device 303. Wireless communications device 303 at step 317 sends its data frames concurrently with data frames from other wireless communications devices. Upon receiving the data frames or the resource requests, base station 301 would repeat steps 312 and 313 if further transmission opportunities exist for the wireless communications devices.

Using MU operation for uplink OFDMA/MIMO can increase the efficiency and reduce the collisions. In one novel aspect, the MU operation is provide to reduce interference from passerby wireless communications devices. In the first step, one wireless communications device or station (STA) sends a regular RTS to reserve a transmission opportunity (TXOP). The base station responds with a modified CTS. In one embodiment, the modified CTS contains a modified RPS frame carries RAW information for the selected wireless communications devices to send PS-poll with uplink data indication. In the second step, the wireless communications devices receiving the modified CTS send modified PS-poll with uplink data indication. There are two alternatives for step three. In one embodiment, the RTS-originating base station sends uplink data first, which provides the base station time to determine the Resource Allocation Map. In another embodiment, upon receiving all the PS-poll from the wireless communications devices, the base station determines resource allocation for OFDMA and sends the group resource allocation MAP to the wireless communications devices followed by a regular CTS frame. Upon receiving the regular CTS frame, the wireless communications devices send their data frames concurrently. The base station returns acknowledges.

Figure 4:
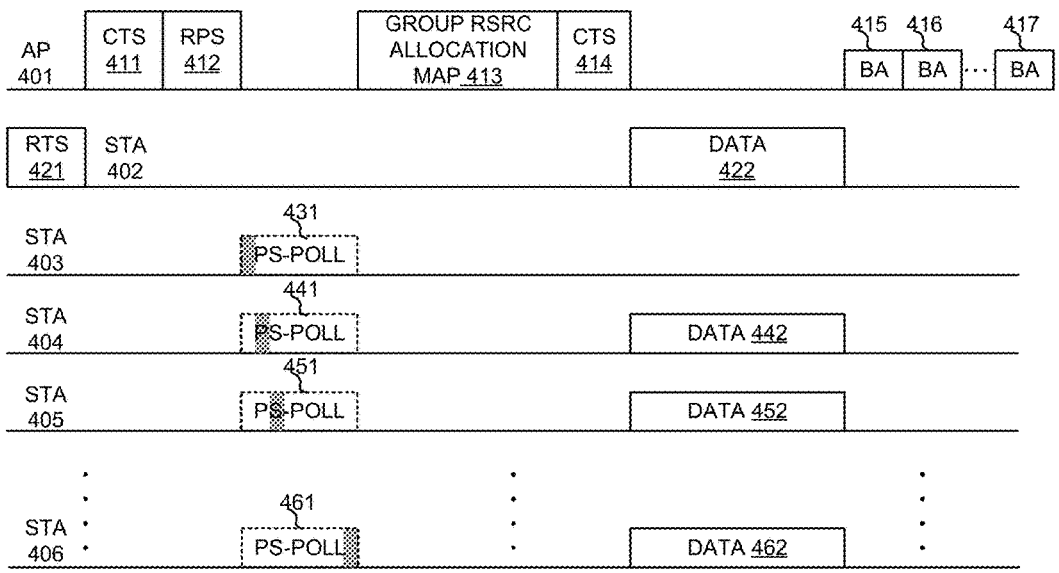
FIG. 4 illustrates detailed steps for the uplink MU method in OFDMA/MIMO system when the initiating wireless communications device sends its data frames together with other wireless communications devices in accordance with embodiments of the current invention.

FIG. 4 illustrates detailed steps for the uplink MU method in OFDMA/MIMO system when the initiating wireless communications device sends its data frames together with other wireless communications devices in accordance with embodiments of the current invention. Multiple wireless communications devices/stations (STA) 402, 403, 404, 405, and 406 connect to a base station 401. At step 421, STA 402 originates a regular RTS. Upon receiving the RTS, base station/AP 401 sends a modified CTS at step 411. The modified CTS is followed by a modified RPS 412. Upon receiving the modified CTS and RPS, STA 403, 404, 405 and 406 starts to send PS-poll 431, 441, 451, and 461, respectively, with uplink data indication. As an illustration, STA 403 does not has any uplink data to be sent. STA 404, 405 and 406 all has uplink data to be transmitted. Upon receiving the uplink indications from the wireless devise, AP 401 determines resource allocation for each wireless communications device that has uplink data to be transmitted. At step 413, AP 401 sends the group resource-allocation map (RAM) to the wireless communications devices. In one embodiment, the modified group RAM includes one or more of the elements including the group ID, the type (OFDMA or MIMO), channel allocation, and modulation and coding scheme (MCS). In one embodiment, the network allocation vector (NAV) in the modified CTS 411 is set to allocate resource to cover until the modified group-resource-allocation map 413. Group RAM 413 is followed by a regular CTS 414, whose NAV covers the MU data transmission and the acknowledge frames. Upon receiving CTS 414, the wireless communications devices that has uplink data and has resource allocated by AP 401, sends their data frames to AP 401 concurrently according to group RAM 413. Wireless communications devices 402, 404, 405 and 406 send their corresponding data frames at steps 422, 442, 452, and 462, respectively. Upon receiving the data frames from the wireless communications devices, AP 401 sends acknowledge packages 415, 416 and 417. In one embodiment, the acknowledgement is sent sequentially.

Figure 5:
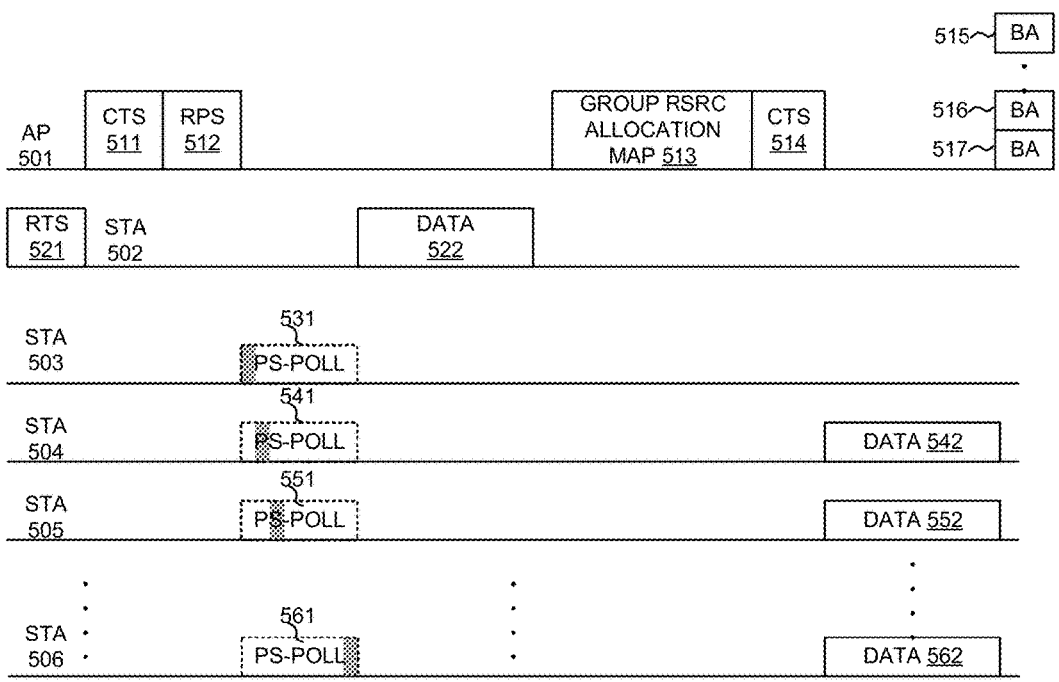
FIG. 5 illustrates detailed steps for the uplink MU method in OFDMA/MIMO system when the initiating wireless communications device sends its data frames before other wireless communications devices in accordance with embodiments of the current invention.

FIG. 5 illustrates detailed steps for the uplink MU method in OFDMA/MIMO system when the initiating wireless communications device sends its data frames before other wireless communications devices in accordance with embodiments of the current invention. Multiple wireless communications devices/stations (STA) 502, 503, 504, 505, and 506 connect to a base station 501. At step 521, STA 502 originates a regular RTS. Upon receiving the RTS, base station/AP 501 sends a modified CTS at step 511. The modified CTS is followed by a modified RPS 512. Upon receiving the modified CTS and RPS, STA 503, 504, 505 and 506 starts to send PS-poll 531, 541, 551, and 561, respectively, with uplink data indication. As an illustration, STA 503 does not has any uplink data to be sent. STA 504, 505 and 506 all has uplink data to be transmitted. The RTS-originating wireless communications device 502 sends its data frames at step 522. Upon receiving the uplink indications from the wireless devise, AP 501 determines resource allocation for each wireless communications device that has uplink data to be transmitted. At step 513, AP 501 sends the group resource-allocation map (RAM) to the wireless communications devices. In one embodiment, the modified group RAM includes one or more of the elements including the group ID, the type (OFDMA or MIMO), channel allocation, and modulation and coding scheme (MCS). In one embodiment, the network allocation vector (NAV) in the modified CTS 511 is set to allocate resource to cover until the modified group-resource-allocation map 513. Group RAM 513 is followed by a regular CTS 514, whose NAV covers the MU data transmission and the acknowledge frames. Upon receiving CTS 514, the wireless communications devices that has uplink data and has resource allocated by AP 501, sends their data frames to AP 401 concurrently according to group RAM 513. Wireless communications devices 504, 505 and 506 send their corresponding data frames at steps 542, 552, and 562, respectively. Upon receiving the data frames from the wireless communications devices, AP 501 sends acknowledge packages 515, 516 and 517. In one embodiment, the acknowledgement is sent duplicated as shown.

Figure 6:
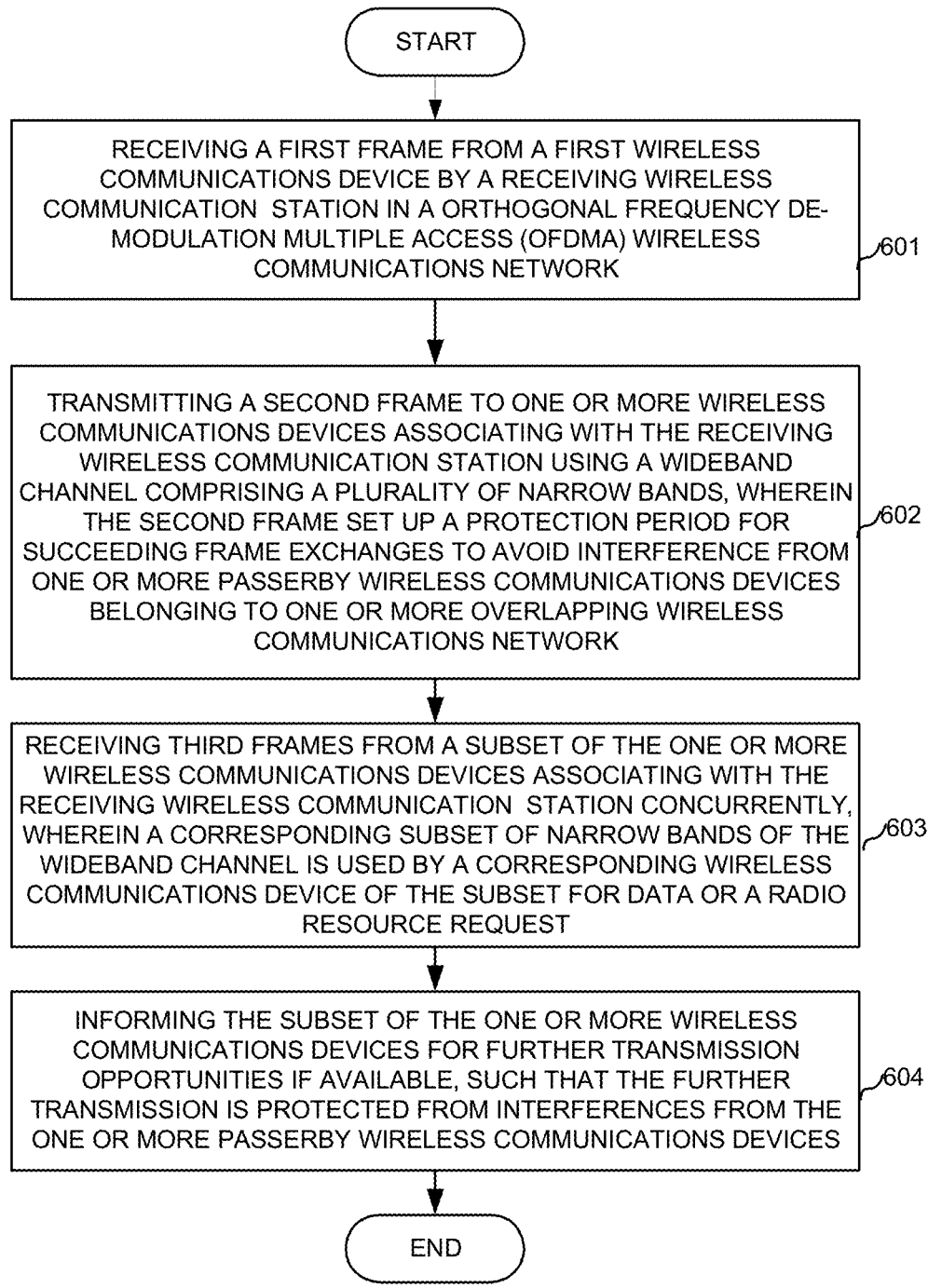
FIG. 6 illustrates an exemplary flow chart for a base station to perform UL MU in an OFDMA/MIMO system in accordance with embodiments of the current invention.

FIG. 6 illustrates an exemplary flow chart for a base station to perform UL MU in an OFDMA/MIMO system in accordance with embodiments of the current invention. At step 601, the receiving wireless communications station receives a first frame from a first wireless communications device in a Orthogonal Frequency De-Modulation Multiple Access (OFDMA) wireless communications network. At step 602, the receiving wireless communications station transmits a second frame to one or more wireless communications devices associating with the receiving wireless communication station using a wideband channel comprising a plurality of narrow bands, wherein the second frame set up a protection period for succeeding frame exchanges to avoid interference from one or more passerby wireless communications devices belonging to one or more overlapping wireless communications network. At step 603, the receiving wireless communications station receives third frames from a subset of the one or more wireless communications devices associating with the receiving wireless communications station concurrently, wherein a corresponding subset of narrow bands of the wideband channel is used by a corresponding wireless communications device of the subset for data or a radio resource request. At step 604, the receiving wireless communications station informs the subset of the one or more wireless communications devices for further transmission opportunities if available, such that the further transmission is protected from interferences from the one or more passerby wireless communications devices.

Figure 7:
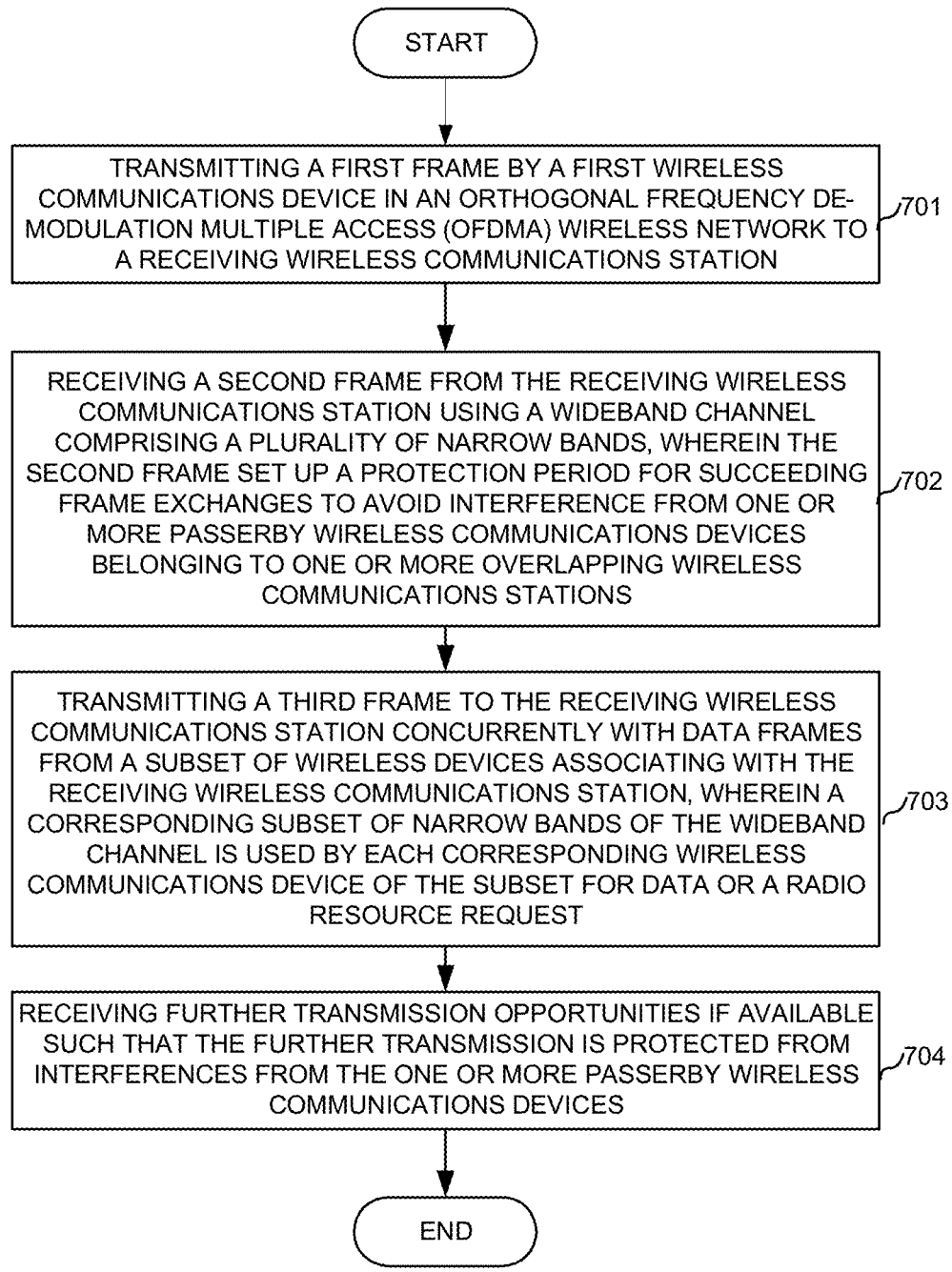
FIG. 7 illustrates an exemplary flow chart for a wireless communications device to perform UL MU in an OFDMA/MIMO system in accordance with embodiments of the current invention.

FIG. 7 illustrates an exemplary flow chart for a wireless communications device to perform UL MU in an OFDMA/MIMO system in accordance with embodiments of the current invention. At step 701, the wireless communications device transmits a first frame by a first wireless communications device in an Orthogonal Frequency De-Modulation Multiple Access (OFDMA) wireless network to a receiving wireless communications station. At step 702, the wireless communications device receives a second frame from the receiving wireless communications station using a wideband channel comprising a plurality of narrow bands, wherein the second frame set up a protection period for succeeding frame exchanges to avoid interference from one or more passerby wireless communications devices belonging to one or more overlapping wireless communications stations. At step 703, the wireless communications device transmits a third frame to the receiving wireless communications station concurrently with data frames from a subset of wireless communications devices associating with the receiving wireless communications station, wherein a corresponding subset of narrow bands of the wideband channel is used by each corresponding wireless communications device of the subset for data or a radio resource request. At step 704, the wireless communications device receives receiving further transmission opportunities if available such that the further transmission is protected from interferences from the one or more passerby wireless communications devices.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A many to one communication method, comprising:
 a) receiving a first frame from a first wireless communications device by a receiving wireless communication station in an Orthogonal Frequency Division Multiple Access (OFDMA) wireless communications network;
b) transmitting a second frame to a plurality of wireless communications devices associating with the receiving wireless communication station using a wideband channel comprising a plurality of narrow bands by the receiving wireless communications station, wherein the second frame set up a protection period for succeeding frame exchanges concurrently for a subset of the plurality of wireless communications devices associating with the receiving wireless communication station to avoid interference from one or more passerby wireless communications devices belonging to one or more overlapping wireless communications network;
c) receiving, by the receiving wireless communications station, third frames from one or more wireless communications devices in the subset of the plurality of wireless communications devices associating with the receiving wireless communication station concurrently, wherein a corresponding subset of narrow bands of the wideband channel is used by a corresponding wireless communications devices of the subset for data or a radio resource request; and
d) informing, by the receiving wireless communications station, the subset of the plurality of wireless communications devices for further transmission opportunities if available, such that the further transmission is protected from interferences from the one or more passerby wireless communications devices.

2. The method of claim 1, wherein the first frame is a radio resource request frame.

3. The method of claim 1, wherein the first frame is data frame.

4. The method of claim 1, wherein the second frame includes resource allocation information.

5. The method of claim 4, wherein the second frame comprises an indicator and a parameter set for a restricted access window for resource request for the subset of the one or more wireless communications devices.

6. The method of claim 4, wherein the second frame comprises an indicator and a parameter set for a restricted access window for data for the subset of the plurality of wireless communications devices.

7. The method of claim 4, wherein the resource allocation information comprises at least one parameter selecting from a group comprising a group ID, channel allocation, and modulation and type of operation coding schemes.

8. The method of claim 1, wherein the third frames are resource request frames from the subset of the plurality of wireless communications devices associating with the receiving wireless communications station.

9. The method of claim 1, wherein the third frames are data frames from the subset of the plurality of wireless communications devices associating with the receiving wireless communications station.

10. The method of claim 1, wherein the receiving wireless communications station repeats the steps b) to d) one or more times.

11. A method, comprising:
a) transmitting a first frame by a first wireless communications device in an Orthogonal Frequency Division Multiple Access (OFDMA) wireless network to a receiving wireless communications station;
b) receiving, by the first wireless communications device, a second frame from the receiving wireless communications station using a wideband channel comprising a plurality of narrow bands, wherein the second frame set up a protection period for succeeding frame exchanges concurrently from a subset of a plurality of wireless communications devices associating with the receiving wireless communications station to avoid interference from one or more passerby wireless communications devices belonging to one or more overlapping wireless communications stations;
c) transmitting, by the first wireless communications device, a third frame to the receiving wireless communications station during the protection period set up by the second frame concurrently with data frames from the subset of wireless communications devices associating with the receiving wireless communications station, wherein a corresponding subset of narrow bands of the wideband channel is used by each corresponding wireless communications device of the subset for data or a radio resource request; and
d) receiving, by the first wireless communications device, further transmission opportunities if available such that the further transmission is protected from interferences from the one or more passerby wireless communications devices.

12. The method of claim 11, wherein the first frame is a radio resource request frame.

13. The method of claim 11, wherein the first frame is data frame.

14. The method of claim 11, wherein the second frame includes resource allocation information.

15. The method of claim 14, wherein the second frame comprises an indicator and a parameter set for a restricted access window for resource request for the subset of the one or more wireless communications devices.

16. The method of claim 14, wherein the second frame comprises an indicator and a parameter set for a restricted access window for data for the subset of the plurality of wireless communications devices.

17. The method of claim 14, wherein the resource allocation information comprises at least one parameter selecting from a group comprising a group ID, channel allocation, and modulation and type of operation coding schemes.

18. The method of claim 11, wherein the third frames are resource request frames from the subset of the plurality of wireless communications devices associating with the receiving wireless communications station.

19. The method of claim 11, wherein the third frames are data frames from the subset of the plurality of wireless communications devices associating with the receiving wireless communications station.

20. The method of claim 11, wherein the first wireless communications device repeats steps b) to d) one or more times.

21. An apparatus, comprising:
a transceiver that transmits and receives radio signals via a radio access link;
a first frame handler that transmits a first frame to a receiving wireless communications station;
a second frame handler that receives a second frame from the receiving wireless communications station using a wideband channel comprising a plurality of narrow bands, wherein the second frame set up a protection period for succeeding frame exchanges concurrently for the subset of the plurality of wireless communications devices to avoid interference from one or more passerby wireless communications devices belonging to one or more overlapping base stations;
a third frame handler transmits a third frame to the receiving wireless communications station during the protection period set up by the second frame concurrently with data frames from a subset of the plurality of wireless communications devices associating with the receiving wireless communications station, wherein a corresponding subset of narrow bands of the wideband channel is used by each corresponding wireless communications device of the subset for data or a radio resource request; and an interference handler that receives further transmission opportunities if available such that the further transmission is protected from interferences from the one or more passerby wireless communications devices.

22. The apparatus of claim 21, wherein the second frame comprises an indicator and a parameter set for a restricted access window for resource request for the subset of the plurality of wireless communications devices.

23. The apparatus of claim 21, wherein the second frame comprises an indicator and a parameter set for a restricted access window for data for the subset of the plurality of wireless communications devices.

24. The apparatus of claim 21, wherein the third frames are resource request frames or data frames from the subset of the plurality of wireless communications devices associating with the receiving wireless communications station.

* * * * *